US012719263B2

(12) United States Patent
Gullapudi et al.

(10) Patent No.: US 12,719,263 B2
(45) Date of Patent: Aug. 25, 2026

(54) TECHNIQUES FOR USING AN ENERGY STORAGE SYSTEM AS SOFT STARTER FOR LARGE INDUCTIVE DEVICES

(71) Applicant: Caterpillar Inc., Peoria, IL (US)

(72) Inventors: L S N V A Vinaykumar Gullapudi, West Godavari District (IN); Shraddha Betageri, Gadag (IN)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 18/432,399

(22) Filed: Feb. 5, 2024

(65) Prior Publication Data

US 2025/0253646 A1 Aug. 7, 2025

(51) Int. Cl.
*H02H 9/00* (2006.01)
*H02H 1/04* (2006.01)
*H02J 3/007* (2026.01)
*H02J 3/40* (2026.01)

(52) U.S. Cl.
CPC ............ *H02H 9/002* (2013.01); *H02H 1/043* (2013.01); *H02J 3/007* (2020.01); *H02J 3/40* (2013.01)

(58) Field of Classification Search
CPC . H02H 1/043; H02H 9/002; H02J 3/40; H02J 3/007
See application file for complete search history.

(56) References Cited

U.S. PATENT DOCUMENTS 9,673,738 B2 6/2017 Miller et al.
11,411,391 B2 * 8/2022 Jung .................. H02J 7/00306
2014/0049865 A1 2/2014 Dougal et al.
2017/0214250 A1 7/2017 Zietlow et al.
2018/0248378 A1 8/2018 Ren
2021/0006067 A1 * 1/2021 Donahue .................. H02J 9/06
2023/0402851 A1 * 12/2023 Babu ..................... H02J 3/0012
2025/0042273 A1 * 2/2025 Yu ........................ H02J 7/0013

FOREIGN PATENT DOCUMENTS

CN 101702603 5/2010
CN 201563083 8/2010
CN 212343335 1/2021

OTHER PUBLICATIONS

Written Opinion and International Search Report for Int'l. Patent Appln. No. PCT/US2025/012483, mailed May 21, 2025 (12 pgs).

* cited by examiner

*Primary Examiner* — Thienvu V Tran
*Assistant Examiner* — Christopher J Clark
(74) *Attorney, Agent, or Firm* — Schwegman, Lundberg & Woessner

(57) ABSTRACT

A Battery Energy Storage System (BESS) may be used to assist with the startup of large electromagnetic devices, such as including inductive loads, to reduce inrush current. By leveraging the BESS, the described techniques allow for a controlled ramp-up of voltage and frequency to emulate a Voltage/Frequency (V/f) starting method for motors and a gradual energization for transformers. This approach minimizes voltage sags and mitigates inrush currents, thereby enhancing the stability of the power system and reducing the risk of tripping protection devices.

20 Claims, 6 Drawing Sheets

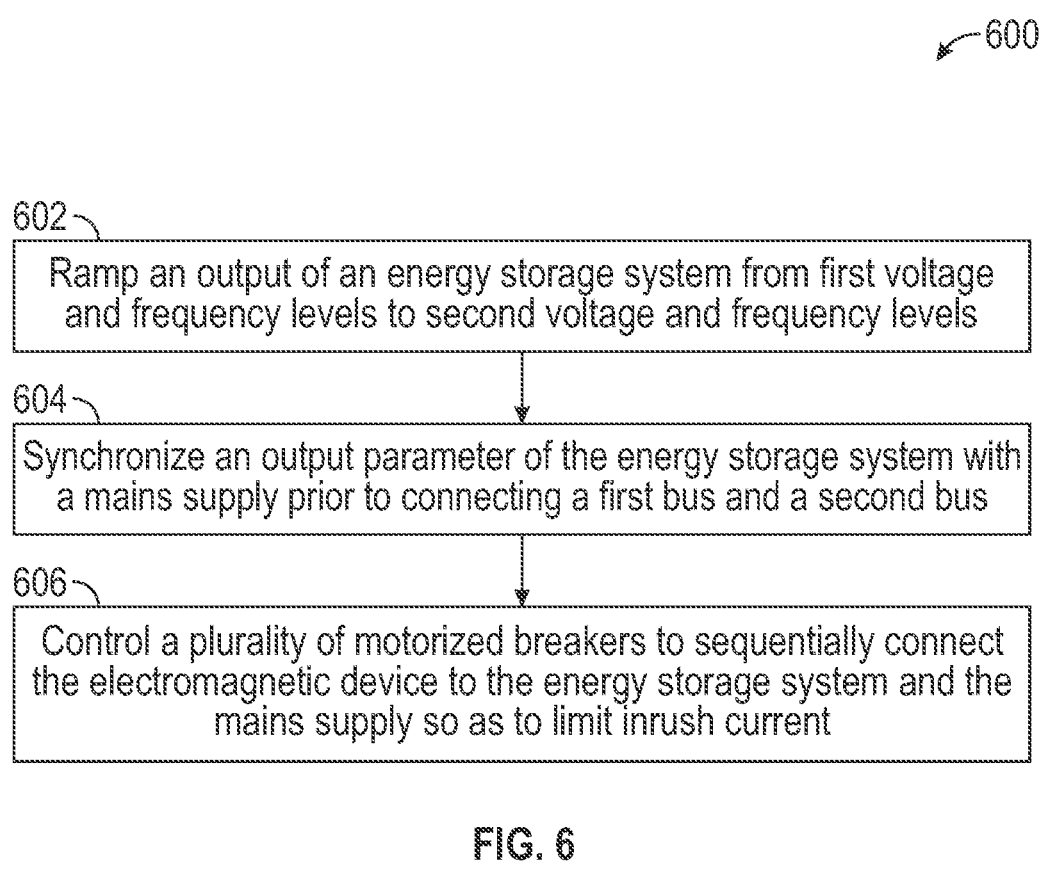

600

602 Ramp an output of an energy storage system from first voltage and frequency levels to second voltage and frequency levels 604 Synchronize an output parameter of the energy storage system with a mains supply prior to connecting a first bus and a second bus 606 Control a plurality of motorized breakers to sequentially connect the electromagnetic device to the energy storage system and the mains supply so as to limit inrush current

FIG. 6

TECHNIQUES FOR USING AN ENERGY STORAGE SYSTEM AS SOFT STARTER FOR LARGE INDUCTIVE DEVICES

FIELD OF THE DISCLOSURE

This document pertains generally, but not by way of limitation, to electrical power systems and, more specifically, to systems and methods for the controlled starting of inductive loads.

BACKGROUND

In modern power systems, the integration of renewable energy sources and advancements in energy storage technologies have led to significant changes in how electricity is generated, distributed, and consumed. The increasing adoption of renewable energy sources, such as solar and wind power, has introduced variability and intermittency in power generation, necessitating the development of more flexible and adaptive power systems.

Battery Energy Storage Systems (BESS) have emerged as a key technology in the transition towards more sustainable and resilient power grids. BESS units are capable of storing electrical energy for later use, providing a buffer that can help balance supply and demand, stabilize the grid, and enhance the integration of renewable energy sources. They offer a range of services including peak shaving, load leveling, frequency regulation, and emergency backup power.

With the evolution of smart grid technologies, there is an increasing emphasis on developing systems that can intelligently manage the operation of electrical devices and energy storage systems. Smart grid solutions aim to enhance the reliability, efficiency, and sustainability of power systems while accommodating the dynamic nature of modern electricity demands and generation capabilities.

CN201563083U relates to a storage battery supplied direct current motor soft starter, which has higher precision, adjustable starting time and frequency and automatic voltage stabilization, does not have starting current impact or contact sintering phenomenon, saves energy and does not influence the normal work of other loads. The soft starter comprises an LCD (liquid crystal display) display and keyboard module, a comprehensive control module and a direct current motor power box, wherein the comprehensive control module is connected with the direct current motor power box; the LCD display and keyboard module and the comprehensive control module carry out two-way communication; the comprehensive control module comprises a microcontroller module, a voltage and current signal sampling module and an IGBT (Insulated Gate Bipolar Transistor) drive module; the voltage and current signal sampling module carries out voltage and current real-time sampling on the direct current motor power box and an absorbing circuit and sends a voltage and current sample to the microcontroller module; the microcontroller module is connected with a PWM (Pulse-Width Modulation) auxiliary circuit, a drive circuit and the IGBT drive module in sequence; the IGBT drive module is connected with the absorbing circuit and the direct current motor power box; the drive circuit is connected with the absorbing circuit; the absorbing circuit is connected with the microcontroller module; and a power supply device supplies power to each module.

SUMMARY OF THE DISCLOSURE

This disclosure describes various techniques to use a Battery Energy Storage System (BESS) to assist with the startup of large electromagnetic devices, such as including inductive loads, to reduce inrush current. By leveraging the BESS, the described techniques allow for a controlled ramp-up of voltage and frequency to emulate a Voltage/Frequency (V/f) starting method for motors and a gradual energization for transformers. This approach minimizes voltage sags and mitigates inrush currents, thereby enhancing the stability of the power system and reducing the risk of tripping protection devices.

In some aspects, this disclosure is directed to a system for reducing an inrush current of an electromagnetic device coupled with an energy storage system through a first bus, the system comprising: a controller in electrical communication with a plurality of motorized breakers, the plurality of motorized breakers configured for selectively connecting or isolating the electromagnetic device between a first bus and a second bus, wherein a mains supply is coupled with the electromagnetic device through the second bus, the controller configured for: ramping an output of the energy storage system from first voltage and frequency levels to second voltage and frequency levels; synchronizing an output parameter of the energy storage system with the mains supply prior to connecting the first bus and the second bus; and controlling the plurality of motorized breakers to connect the electromagnetic device to the energy storage system and the mains supply so as to limit inrush current.

In some aspects, this disclosure is directed to a method for reducing an inrush current of an electromagnetic device, the method comprising: ramping an output of an energy storage system from first voltage and frequency levels to a second voltage and frequency levels; synchronizing an output parameter of the energy storage system with a mains supply prior to connecting a first bus and a second bus; and controlling a plurality of motorized breakers to sequentially connect the electromagnetic device to the energy storage system and the mains supply so as to limit inrush current.

In some aspects, this disclosure is directed to a system for reducing an inrush current of an inductive load coupled with an energy storage system through a first bus, the system comprising: a controller in electrical communication with a plurality of motorized breakers, the plurality of motorized breakers configured for selectively connecting or isolating the inductive load between a first bus and a second bus, wherein a mains supply is coupled with the inductive load through the second bus, the controller configured for: a controller configured for: ramping the output of the energy storage system from first voltage and frequency levels to second voltage and frequency levels; synchronizing an output parameter of the energy storage system to the mains supply prior to connecting the first bus and the second bus; controlling the plurality of motorized breakers to connect the inductive load to the energy storage system and the mains supply so as to limit inrush current; disconnecting the electromagnetic device from the energy storage system; and maintaining the coupling between the energy storage system and the second bus after connecting the electromagnetic device to the energy storage system and the mains supply.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a flow diagram of an example of a method for reducing an inrush current of an electromagnetic device.

DETAILED DESCRIPTION

In industrial and utility power systems, the startup of large electromagnetic devices, such as large motors and transformers, presents a challenge due to the high inrush currents they draw. These inrush currents may be several times higher than the normal operating current, leading to voltage drops, increased mechanical and electrical stress, and potential tripping of protection systems. This problem is exacerbated in environments that rely on a combination of grid power and local generation, where the capacity to absorb such transients is limited. The present inventors have recognized that traditional methods to mitigate these issues, such as using resistive soft starters or variable frequency drives for motors, and pre-insertion resistors or controlled switching for transformers, may be complex, costly, and may not be suitable for all applications.

The present inventors have recognized that a Battery Energy Storage System (BESS) may be used to assist with the startup of large electromagnetic devices, such as including inductive loads, to reduce inrush current. By leveraging the BESS, the techniques of this disclosure allow for a controlled ramp-up of voltage and frequency to emulate a Voltage/Frequency (V/f) starting method for motors and a gradual energization for transformers. This approach minimizes voltage sags and mitigates inrush currents, thereby enhancing the stability of the power system and reducing the risk of tripping protection devices.

Figure 1:
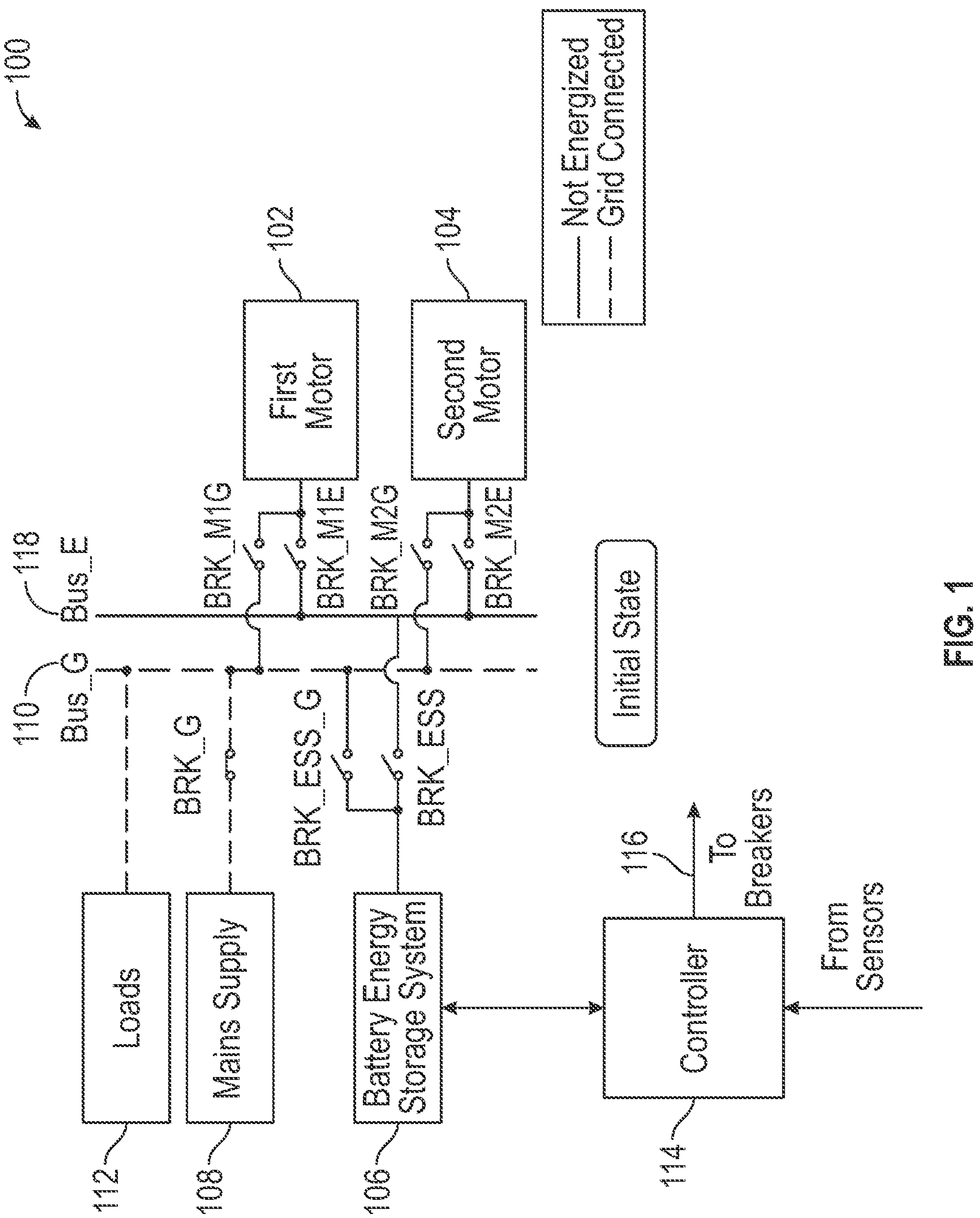
FIG. 1 depicts a schematic of an example of a system for reducing an inrush current of an electromagnetic device coupled with an energy storage system through a bus, where the system is in a first state.

FIG. 1 depicts a schematic of an example of a system for reducing an inrush current of an electromagnetic device coupled with an energy storage system through a bus, where the system is in a first state. The system 100 is shown in an initial state. The system 100 includes a first electromagnetic device, namely a first motor 102 and, in some examples, includes additional electromagnetic devices, such as one or more second motors 104. In the example shown in FIG. 1, the motors are inductive motors. As described below, in other examples, the electromagnetic devices include one or more transformers or a combination of motor(s) and transformer(s). The system 100 further includes a battery energy storage system 106, a mains supply 108 coupled with a first bus 110 ("Bus_G"), and one or more electrical loads 112 coupled with and configured to receive power from the first bus 110. In some examples, the battery energy storage system 106 is configured for generating output power at user-configurable voltage and frequency levels. The battery energy storage system 106 includes one or more battery module, where each battery module includes one or more battery cells. The mains supply 108 may include a grid, microgrid, generator set ("genset"), wind turbines, and/or photovoltaic (PV) arrays.

The system 100 further includes a plurality of motorized breakers. The mains supply 108 may be coupled with the first bus 110 via a breaker "BRK_G". The battery energy storage system 106 may be coupled with the first bus 110 via a breaker "BRK_ESS_G" and the battery energy storage system 106 may be coupled with a second bus 118 ("Bus_E") via a breaker "BRK_ESS". The first motor 102 may be coupled with the first bus 110 via a breaker "BRK_M1G" and may be coupled with the second bus 118 via a breaker "BRK_MIE". Similarly, the second motor 104 may be coupled with the first bus 110 via a breaker "BRK_M2G" and may be coupled with the second bus 118 via a breaker "BRK_M2E". The motorized breakers are configured for selectively connecting or isolating the electromagnetic device, e.g., one or both of the first motor 102 and the second motor 104, between the first bus 110 and the second bus 118.

The system 100 is shown in an initial state in FIG. 1 with BRK_G=1, BRK_ESS=0, BRK_ESS_G=0, BRK_MIG=0, BRK_MIE=0, where 1 is closed and 0 is open. As seen in the initial state of FIG. 1, the battery energy storage system 106 is not coupled with either the first bus 110 or the second bus 118. Further, the first bus 110 is connected to the mains supply 108 and the second bus 118 is not energized.

The system 100 further includes a controller 114 in electrical communication with the motorized breakers. The controller 114 is configured to output corresponding signals 116 to individual ones of the plurality of motorized breakers to control their opening/closing. The controller 114 is configured to receive input from one or more sensors, such as current and/or voltage sensors positioned at various nodes in the system. For example, sensors may be positioned so as to receive data representing electrical conditions at the output of the battery energy storage system 106, on the first bus 110, on the second bus 118, at the first motor 102, and/or at the second motor 104. The controller 114 is also in electrical communication with the battery energy storage system 106 and controls the operation of the battery energy storage system 106, as described below.

Figure 2:
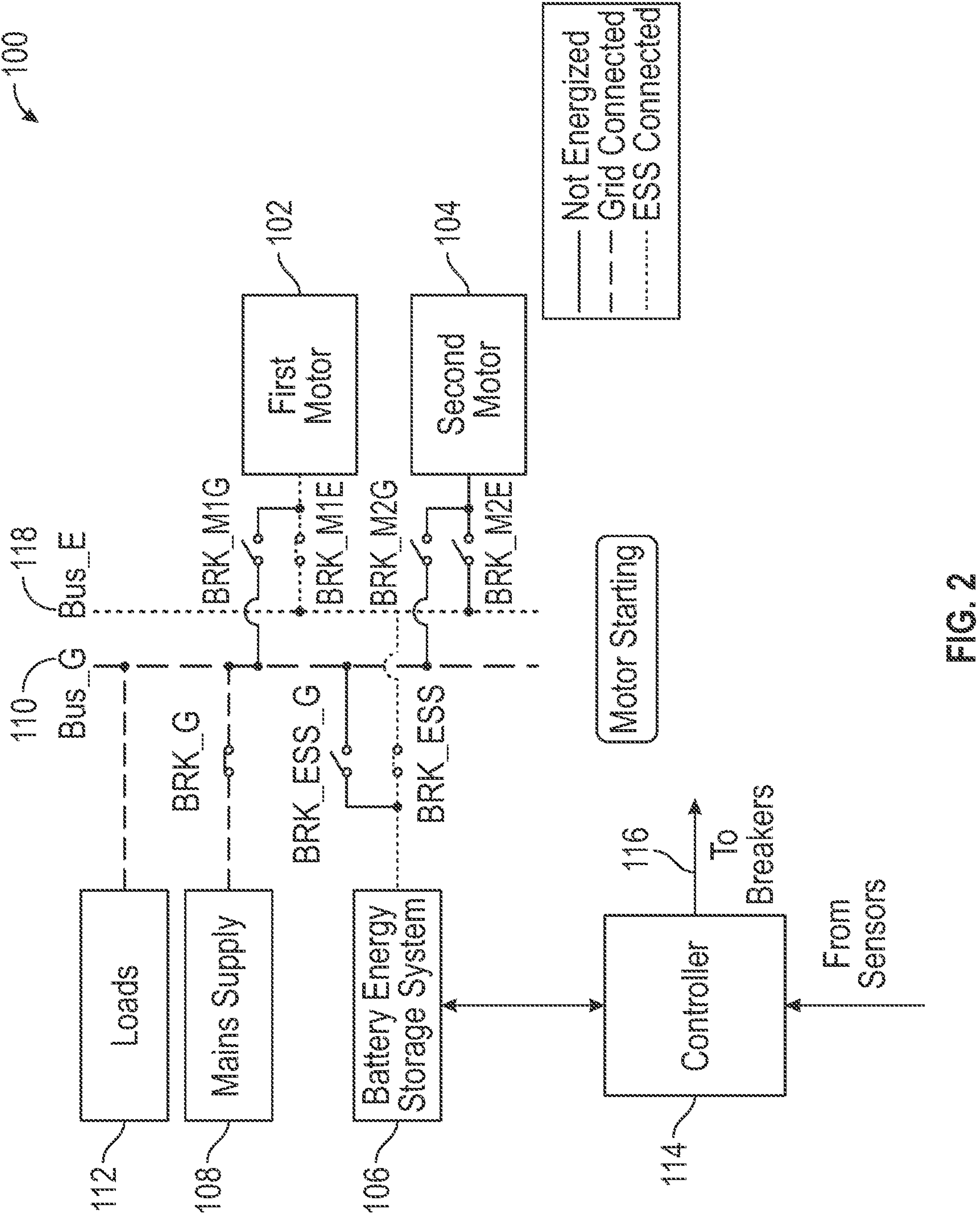
FIG. 2 depicts a schematic of the system of FIG. 1 in a second state.

FIG. 2 depicts a schematic of the system of FIG. 1 in a second state. FIG. 2 includes features that are similar to those shown and described above with respect to FIG. 1 and similar reference numbers are used for such features. For brevity, those features will not be described again in detail. The system 100 is shown in FIG. 2 in a motor starting state.

In some examples, the controller 114 maintains the battery energy storage system 106 in a grid forming mode, and maintains voltage and frequency levels at a lower value in the motor starting state. Grid forming mode refers to the capability of battery energy storage system 106 to establish and control the voltage and frequency parameters of an electrical grid. In this mode, the battery energy storage system 106 acts as a voltage source, providing the reference for grid voltage and frequency, thereby enabling it to start and support a grid or microgrid independently, even in the absence of an external power supply.

The controller 114 controls the plurality of motorized breakers to sequentially connect the first motor 102 to the battery energy storage system 106 and the mains supply 108 so as to limit inrush current. The controller 114 closes breaker BRK_ESS to couple the battery energy storage system 106 with the second bus 118 and closes breaker BRK_MIE to couple the first motor 102 with the second bus

118, which couples the first motor 102 to the battery energy storage system 106 via the second bus 118.

The controller 114 controls the battery energy storage system 106 to ramp up an output of the battery energy storage system 106 from first voltage and frequency levels, such as in a fixed ramp, until nominal second voltage and frequency levels are reached, such as voltage and frequency levels of 480V, 60 Hz. In some examples, the controller 114 ramps the output of the battery energy storage system 106 from the first voltage and frequency levels to the second voltage and frequency levels over a predetermined duration based on a characteristic of the electromagnetic device. For example, the characteristic of the electromagnetic device includes one or both of a size and inertia of the electromagnetic device. In this manner, the ramp time may be configurable based on either or both of motor (or transformer) size and inertia.

The controller 114 controls the battery energy storage system 106 so as to keep the voltage and frequency at its output constant and waits for a time to ensure motor starting transients are settled. The controller 114 then controls the synchronization of an output parameter of the battery energy storage system 106 to the mains supply 108 prior to connecting the first bus 110 and the second bus 118, such as by adjusting at least one of the output parameters. The output parameters include one or more of voltage, frequency, and phase angle and, in multiphase configurations, phase sequence. Now, the first bus 110 is connected to the mains supply 108 and the second bus 118 is connected to the battery energy storage system 106.

Figure 3:
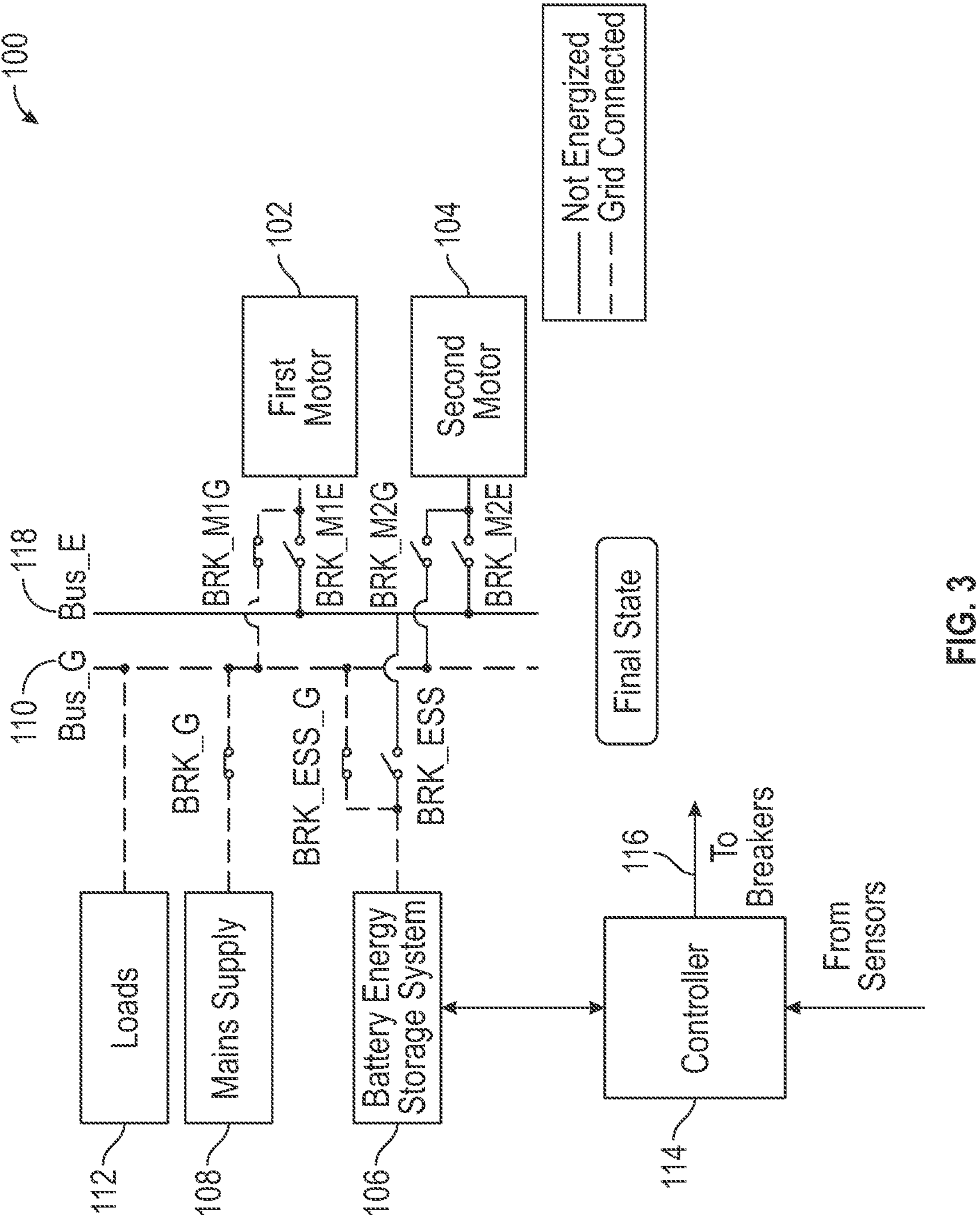
FIG. 3 depicts a schematic of the system of FIG. 1 in a third state.

FIG. 3 depicts a schematic of the system of FIG. 1 in a third state. FIG. 3 includes features that are similar to those shown and described above with respect to FIG. 1 and similar reference numbers are used for such features. For brevity, those features will not be described again in detail. The system 100 is shown in FIG. 3 in a final state.

The controller 114 outputs signals 116 to close the breaker BRK_M1G, which connects the first bus 110 and the second bus 118 via breaker BRK_M1G and breaker BRK_MIE. The controller 114 may wait for a time and then output signals 116 to close breaker BRK_ESS_G to couple the battery energy storage system 106 with the first bus 110 and open the breaker BRK_MIE to disconnect the first motor 102 from the second bus 118.

The controller 114 may continue operating the battery energy storage system 106 in grid firming mode with the first motor 102 and the battery energy storage system 106 both on the first bus 110 (Bus_G). Now, the first bus 110 is connected to the mains supply 108 and the second bus 118 is deenergized. The controller 114 switches to grid firming mode when the battery energy storage system 106 is in parallel with gensets and to grid following mode when the battery energy storage system 106 is in parallel with the grid. The controller 114 may perform this transition by detecting the grid/genset incoming circuit breaker status, such as with pre-programmed delays.

For systems that include additional electromagnetic devices, such as the second motor 104 (and other motors or transformers, if present), the steps described above with respect to FIGS. 1-3 may be repeated, including the controller 114 controlling the plurality of motorized breakers to connect the second electromagnetic device to the battery energy storage system 106 and the mains supply so as to limit inrush current.

In some examples, such as shown in FIG. 3, after disconnecting the first motor 102 from the second bus 118, the battery energy storage system 106 remains coupled with the first bus 110 after connecting the electromagnetic device to the energy storage system and the mains supply via breaker BRK_ESS_G so that the battery energy storage system 106 may supplement the mains supply 108 and improve the stability of the first bus 110. In other examples, the controller 114 outputs signals 116 to control the opening of breaker BRK_ESS_G to disconnect the battery energy storage system 106 from the first bus 110.

Figure 4:
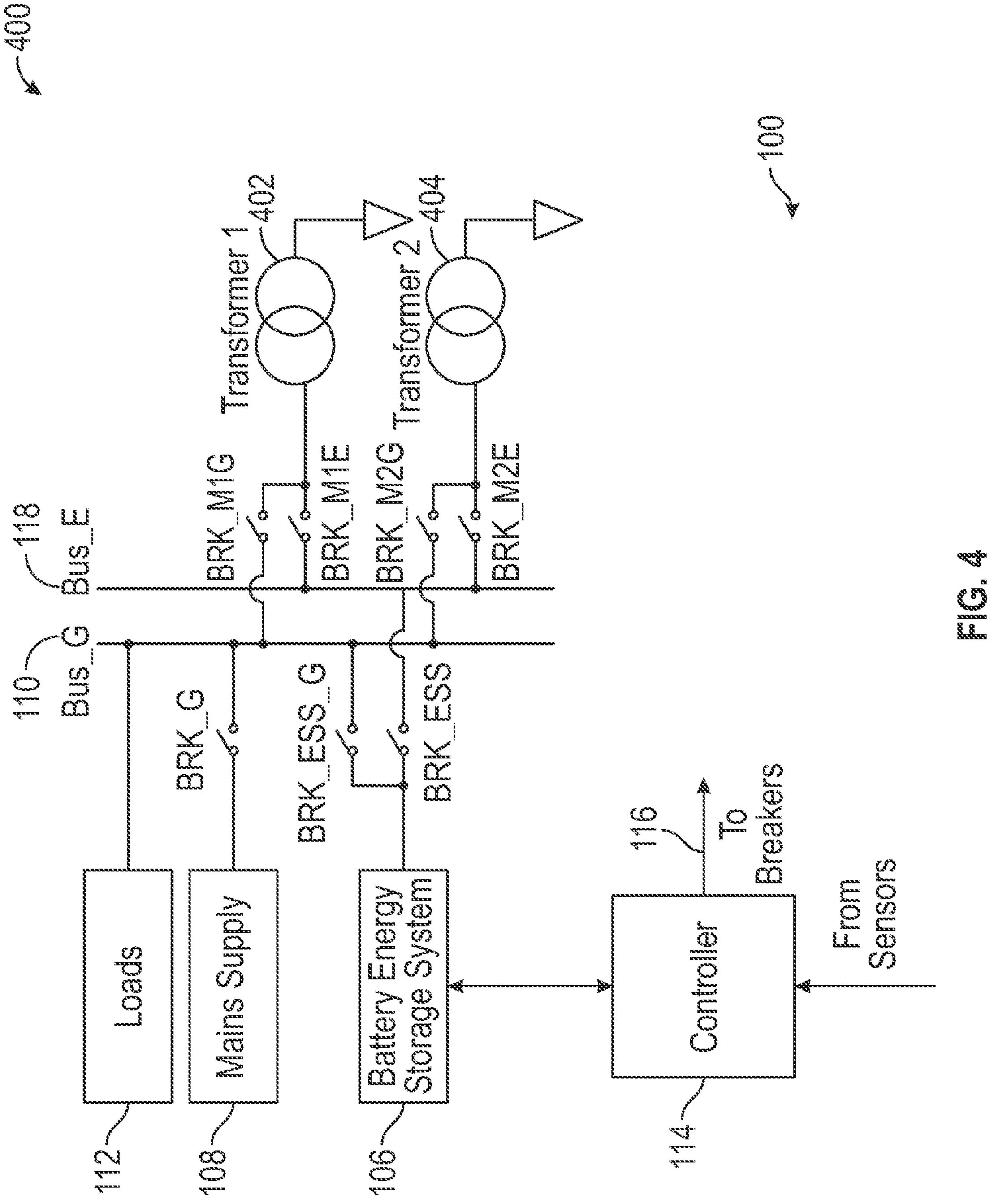
FIG. 4 depicts a schematic of another example of a system for reducing an inrush current of an electromagnetic device coupled with an energy storage system through a bus, where the system is in a first state.

FIG. 4 depicts a schematic of another example of a system for reducing an inrush current of an electromagnetic device coupled with an energy storage system through a bus, where the system is in a first state. The system 400 of FIG. 4 is similar to FIG. 1, with the first motor 102 and the second motor 104 of FIG. 1 replaced with a first transformer 402 and a second transformer 404, respectively. FIG. 4 includes features that are similar to those shown and described above with respect to FIG. 1 and similar reference numbers are used for such features. For brevity, those features will not be described again in detail.

The system 400 in FIG. 4 is shown in an initial state, like the system 100 of FIG. 1. The system 400 may be operated in a second state, like the system 100 in FIG. 2, and in a third state, like the system 100 in FIG. 3. The operation of the system 400 with the first transformer 402 (and, if present, the second transformer 404) is identical to the system 100 with the first motor 102 (and, if present, the second motor 104) as described above with respect to FIGS. 1-3. For brevity, those operations will not be described again in detail.

Figure 5:
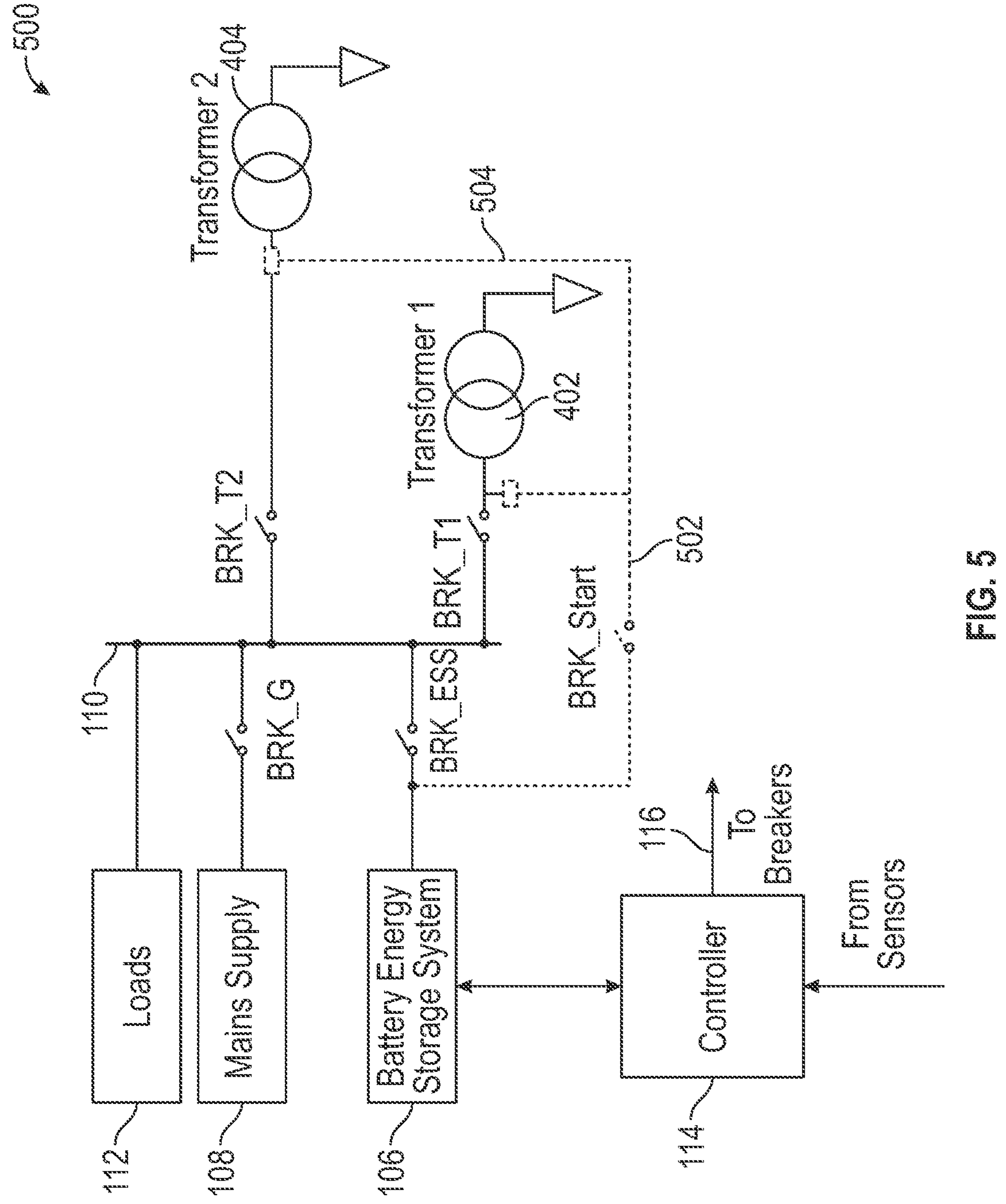
FIG. 5 depicts a schematic of another example of a system for reducing an inrush current of an electromagnetic device coupled with an energy storage system through a bus, where the system is in a first state.

FIG. 5 depicts a schematic of another example of a system for reducing an inrush current of an electromagnetic device coupled with an energy storage system through a bus, where the system is in a first state. FIG. 5 includes features that are similar to those shown and described above with respect to FIG. 4 and similar reference numbers are used for such features. For brevity, those features will not be described again in detail.

Comparing the system 500 FIG. 5 with the system 400 of FIG. 4, the second bus 118 has been removed as well as all of the breakers that were configured to couple with the second bus 118. In FIG. 5, the system 500 includes a flexible cable 502 that may be plugged into the first transformer 402, as described below. Similarly, the system 500 includes a flexible cable 504 that may be plugged into the second transformer 404, if present.

The system 500 is shown in an initial state in FIG. 5 with BRK_G=1, BRK_ESS=1, BRK_T1=0, and BRK_Start=0, where 1 is closed and 0 is open.

The controller 114 outputs signals 116 to open breaker BRK_ESS. Then, an operator may plug the flexible cable 502 into the first transformer 402. The controller 114 maintains the battery energy storage system 106 in grid forming mode and maintains zero voltage. In grid forming mode, the inventor of the battery energy storage system 106 may control its output voltages and frequency. The controller 114 is set to maintain zero voltage, which is effectively the inverter switches in an open state, but it might not be exact ground potential.

The controller 114 outputs signals 116 to close breaker BRK_Start, which couples the battery energy storage system 106 with the first transformer 402. The controller 114 controls the battery energy storage system 106 to ramp up an output of the battery energy storage system 106 from first voltage and frequency levels, such as in a fixed ramp, until nominal second voltage and frequency levels are reached, such as voltage and frequency levels of 480V, 60 Hz. In some examples, the controller 114 ramps the output of the battery energy storage system 106 from the first voltage and frequency levels to the second voltage and frequency levels over a predetermined duration based on a characteristic of the electromagnetic device. For example, the characteristic of the electromagnetic device includes one or both of a size and inertia of the electromagnetic device. In this manner, the ramp time may be configurable based on either or both of motor (or transformer) size and inertia.

The controller 114 waits for a time to ensure transformer inrush transients are settled. The controller 114 then controls the synchronization of an output parameter of the battery energy storage system 106 to the mains supply 108, such as by adjusting at least one of the output parameters. The output parameters include one or more of voltage, frequency, and phase angle and, in multiphase configurations, phase sequence.

The controller 114 outputs signals 116 to close breaker BRK_T1. The controller 114 waits a time before it outputs signals 116 to close breaker BRK_ESS and open BRK_Start. Now, the first transformer 402 and the battery energy storage system 106 are connected to the first bus 110. The controller 114 may control the battery energy storage system 106 to operate in grid firming mode. Finally, the operator may unplug the flexible cable 502. Similar steps to those described above may be performed using the flexible cable 504 and breaker BRK_T2 in configurations that include the second transformer 404.

Comparing the system 400 of FIG. 4 to the system 500 of FIG. 5, the system 400 uses two bus bars and multiple switchgear units, which may increase cost. In addition, the system 400 does not include any manual operations, such as the use of the flexible cable in the system 500.

FIG. 6 is a flow diagram of an example of a method 600 for reducing an inrush current of an electromagnetic device. At block 602, the method 600 includes ramping an output of an energy storage system from first voltage and frequency levels to a second voltage and frequency levels. In some examples, ramping the output of the energy storage system from the first voltage and frequency levels to the second voltage and frequency levels includes ramping the output of the energy storage system from the first voltage and frequency levels to the second voltage and frequency levels over a predetermined duration based on a characteristic of the electromagnetic device. In some examples, the characteristic of the electromagnetic device includes a size of the electromagnetic device. In some examples, the output parameter of the energy storage system includes at least one of voltage, frequency, phase angle, and phase sequence.

At block 604, the method 600 includes synchronizing an output parameter of the energy storage system with a mains supply prior to connecting a first bus and a second bus.

At block 606, the method 600 includes controlling a plurality of motorized breakers to sequentially connect the electromagnetic device to the energy storage system and the mains supply so as to limit inrush current.

In some examples, the ramping, the synchronizing, and the controlling are performed while a controller, such as the controller 114 of FIG. 1, is in a grid forming mode.

In some examples, the electromagnetic device is a first electromagnetic device, and the method 600 includes controlling the plurality of motorized breakers to connect a second electromagnetic device to the energy storage system and the mains supply so as to limit inrush current.

In some examples, the method 600 includes disconnecting the electromagnetic device from the energy storage system, and maintaining the coupling between the energy storage system and the second bus after connecting the electromagnetic device to the energy storage system and the mains supply.

INDUSTRIAL APPLICABILITY

The techniques of this disclosure find their applicability in a variety of industrial settings where large electromagnetic devices, such as motors and transformers, are commonplace. Industries such as manufacturing, mining, oil and gas, and utilities can benefit from the implementation of this technology. The techniques are particularly relevant for sites that rely on a combination of grid power and local generation, such as diesel generators, where maintaining stability and minimizing voltage drops during equipment startup is critical.

In settings including large motors or transformers are essential for operations, the ability to start these electromagnetic devices smoothly without imposing a significant starting current burden on the power supply system is highly advantageous. This soft starting capability can reduce mechanical stress on the motor and associated equipment, leading to lower maintenance costs and extended equipment life. Additionally, the controlled ramp-up of voltage and frequency may prevent the voltage sags that often accompany the startup of large motors, for example, thereby avoiding the potential for operational disruptions and improving overall power quality.

For power systems that include transformers, the invention's approach to transformer energization may mitigate the high inrush currents that typically occur when transformers are brought online. This may prevent the tripping of protection devices and reduce the strain on power generation resources, which is particularly beneficial in microgrid applications and in settings where power generation capacity is limited.

Overall, the industrial applicability of this invention extends to any sector or facility where the management of large electromagnetic devices, e.g., inductive loads, is a concern and where the integration of a BESS can provide operational benefits. The invention's ability to improve the reliability and efficiency of power systems while also offering a differentiating factor for BESS technology makes it a valuable addition to modern industrial operations.

Various Notes

Each of the non-limiting claims or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more claims thereof), either with respect to a particular example (or one or more claims thereof), or with respect to other examples (or one or more claims thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more claims thereof) may be used in combination with each other. Other embodiments may be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A system for reducing an inrush current of an electromagnetic device coupled with an energy storage system through a second bus, the system comprising:

a controller in electrical communication with a plurality of motorized breakers, the plurality of motorized breakers configured for selectively connecting or isolating the electromagnetic device between the first bus and a second bus, wherein a mains supply is coupled with the electromagnetic device through the first bus, the controller configured for:

ramping an output of the energy storage system from first voltage and frequency levels to second voltage and frequency levels;

synchronizing an output parameter of the energy storage system with the mains supply prior to connecting the first bus and the second bus;

controlling the plurality of motorized breakers to connect the electromagnetic device to the energy storage system and the mains supply so as to limit inrush current; and maintaining a coupling between the energy storage system and the first bus after connecting the electromagnetic device to the energy storage system and the mains supply to provide continuous grid support.

2. The system of claim 1, wherein the controller configured for ramping the output of the energy storage system from the first voltage and frequency levels to the second voltage and frequency levels is configured for:

ramping the output of the energy storage system from the first voltage and frequency levels to the second voltage and frequency levels over a predetermined duration based on a characteristic of the electromagnetic device.

3. The system of claim 2, wherein the characteristic of the electromagnetic device includes a size of the electromagnetic device.

4. The system of claim 1, wherein the output parameter of the energy storage system includes at least one of voltage, frequency, phase angle, and phase sequence.

5. The system of claim 1, wherein the energy storage system is configured for generating output power at user-configurable voltage and frequency levels.

6. The system of claim 1, wherein the electromagnetic device includes a motor.

7. The system of claim 1, wherein the electromagnetic device includes a transformer.

8. The system of claim 1, wherein the controller includes a grid forming mode, and wherein the ramping, the synchronizing, and the controlling are performed while the controller is in the grid forming mode.

9. The system of claim 1, wherein the electromagnetic device is a first electromagnetic device, the system further comprising:

a second electromagnetic device, wherein the controller is configured for:

controlling the plurality of motorized breakers to connect the second electromagnetic device to the energy storage system and the mains supply so as to limit inrush current.

10. The system of claim 1, wherein the controller is further configured for:

disconnecting the electromagnetic device from the second bus after connecting the electromagnetic device to the first bus.

11. A method for reducing an inrush current of an electromagnetic device, the method comprising:

ramping an output of an energy storage system from first voltage and frequency levels to second voltage and frequency levels;

synchronizing an output parameter of the energy storage system with a mains supply prior to connecting a first bus and a second bus; and controlling a plurality of motorized breakers to sequentially connect the electromagnetic device to the energy storage system and the mains supply so as to limit inrush current; and maintaining a coupling between the energy storage system and the first bus after connecting the electromagnetic device to the energy storage system and the mains supply to provide continuous grid support.

12. The method of claim 11, wherein ramping the output of the energy storage system from the first voltage and frequency levels to the second voltage and frequency levels includes:

ramping the output of the energy storage system from the first voltage and frequency levels to the second voltage and frequency levels over a predetermined duration based on a characteristic of the electromagnetic device.

13. The method of claim 12, wherein the characteristic of the electromagnetic device includes a size of the electromagnetic device.

14. The method of claim 11, wherein the output parameter of the energy storage system includes at least one of voltage, frequency, phase angle, and phase sequence.

15. The method of claim 11, wherein the ramping, the synchronizing, and the controlling are performed while in a grid forming mode.

16. The method of claim 11, wherein the electromagnetic device is a first electromagnetic device, the method comprising:

controlling the plurality of motorized breakers to connect a second electromagnetic device to the energy storage system and the mains supply so as to limit inrush current.

17. The method of claim 11, comprising:

disconnecting the electromagnetic device from the second bus after connecting the electromagnetic device to the first bus.

18. A system for reducing an inrush current of an inductive load coupled with an energy storage system through a second bus, the system comprising:

a controller in electrical communication with a plurality of motorized breakers, the plurality of motorized breakers configured for selectively connecting or isolating the inductive load between a first bus and the second bus, wherein a mains supply is coupled with the inductive load through the first bus, the controller configured for:

ramping an output of the energy storage system from first voltage and frequency levels to second voltage and frequency levels;

synchronizing an output parameter of the energy storage system to the mains supply prior to connecting the first bus and the second bus;

controlling the plurality of motorized breakers to connect the inductive load to the energy storage system and the mains supply so as to limit inrush current; and maintaining the coupling between the energy storage system and the first bus after connecting the inductive load to the energy storage system and the mains supply to provide continuous grid support.

19. The system of claim 18, wherein the controller configured for ramping the output of the energy storage system from the first voltage and frequency levels to the second voltage and frequency levels is configured for:

ramping the output of the energy storage system from the first voltage and frequency levels to the second voltage and frequency levels over a predetermined duration based on a characteristic of the inductive load.

20. The system of claim 18, wherein the controller includes a grid forming mode, and wherein the ramping, the synchronizing, and the controlling are performed while the controller is in the grid forming mode.

* * * * *